(12) United States Patent
Ornelaz et al.

(10) Patent No.: US 11,374,480 B2
(45) Date of Patent: Jun. 28, 2022

(54) MAGNETIC COUPLER WITH FORCE BALANCING

(71) Applicant: Halliburton Energy Services, Inc., Houston, TX (US)

(72) Inventors: Richard Decena Ornelaz, Frisco, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 320 days.

(21) Appl. No.: 15/764,797

(22) PCT Filed: Dec. 28, 2016

(86) PCT No.: PCT/US2016/068804
§ 371 (c)(1),
(2) Date: Mar. 29, 2018

(87) PCT Pub. No.: WO2018/125070
PCT Pub. Date: Jul. 5, 2018

(65) Prior Publication Data
US 2020/0244154 A1 Jul. 30, 2020

(51) Int. Cl.
*H02K 49/10* (2006.01)
(52) U.S. Cl.
CPC .................. *H02K 49/10* (2013.01)
(58) Field of Classification Search
CPC ...... H02K 49/10; H02K 49/104; H02K 41/02; H02K 7/10; H02K 33/16; H02K 49/102; H02K 33/00; H02K 35/00; H02K 41/031; H02K 41/0356; H02K 51/00

USPC .................................................... 310/92, 103
See application file for complete search history.

(56) References Cited

U.S. PATENT DOCUMENTS

| 5,043,592 | A | 8/1991 | Hochstrasse |
| 7,707,878 | B2 | 5/2010 | Kanayama et al. |
| 2001/0003802 | A1* | 6/2001 | Vitale .................... H02K 49/10 623/3.19 |
| 2001/0026204 | A1 | 10/2001 | Petro |
| 2009/0120967 | A1 | 5/2009 | Bensley |
| 2012/0153620 | A1* | 6/2012 | Artinian .................. F03B 3/103 290/52 |

(Continued)

FOREIGN PATENT DOCUMENTS

| CN | 1045669 A1 | 9/1990 |
| CN | 1128843 A1 | 8/1996 |

(Continued)

OTHER PUBLICATIONS

PCT International Search Report and Written Opinion dated Aug. 18, 2017, issued in corresponding application No. PCT/US2016/068804 filed on Aug. 18, 2017, 14 pgs.

*Primary Examiner* — Michael Andrews
(74) *Attorney, Agent, or Firm* — K&L Gates LLP

(57) ABSTRACT

A magnetic coupling system and a method of balancing a magnetic coupler are provided. The magnetic coupling system includes a follower magnet magnetically coupled to a drive magnet, and a magnetic balancing component located to a side of the follower magnet. Movement of the drive magnet induces corresponding movement of the follower magnet. The magnetic balancing component and the drive magnet exert attractive magnetic forces on the follower magnet in opposite directions.

19 Claims, 3 Drawing Sheets

(56) References Cited

U.S. PATENT DOCUMENTS

2015/0303784 A1* 10/2015 Hunter .................... H02K 7/10
                                                          310/12.18
2016/0053589 A1*  2/2016 Delgado ................ H02P 9/008
                                                          310/94

FOREIGN PATENT DOCUMENTS

| CN | 2785243 Y    | 5/2006  |
|----|--------------|---------|
| CN | 200997559 Y  | 12/2007 |
| CN | 203071792 U  | 7/2013  |
| CN | 106256080 A1 | 12/2016 |
| EP | 2768763 B1   | 4/2017  |
| JP | 2012055071 A | 3/2012  |
| JP | 2013198391 A | 9/2013  |
| WO | 2008125860 A1| 10/2008 |
| WO | 2013057695 A1| 4/2013  |

* cited by examiner

MAGNETIC COUPLER WITH FORCE BALANCING

BACKGROUND

This section is intended to provide relevant background information to facilitate a better understanding of the various aspects of the described embodiments. Accordingly, it should be understood that these statements are to be read in this light and not as admissions of prior art.

Magnetic couplers are used to translate motion between physical barriers, in which a drive magnet is located on one side of the barrier and a follower magnet is located on the other side. The drive magnet is coupled to an actuator which moves the drive magnet, and the drive magnet induces movement in the follower magnet through magnetic coupling. The follower magnet then moves another element or device to carry out the intended function. Devices with magnetic couplers, such as valves, are often used in oil and gas operations, in which the device may come into contact with various fluids and chemicals that may be potentially detrimental to the device over time. Magnetic couplers allow sensitive components such as actuators and electronics to be contained and isolated from the fluids while still carrying out the device function through actuation of the follower magnet.

The drive magnet and the follower magnet of a magnetic coupler are attracted to each other and exert an attractive magnet force on each other. This is what enables magnetic coupling. However, the constant pull strains the structural assemblies of the magnets, such as bearings and other components.

BRIEF DESCRIPTION OF THE DRAWINGS

For a detailed description of the embodiments of the invention, reference will now be made to the accompanying drawings in which:

FIG. 2 is a schematic diagram of a rotational magnetic coupling system with magnetic force balancing, in accordance with one or more embodiments;

DETAILED DESCRIPTION

The present disclosure provides a magnetic coupler system that includes a magnetic balancing component placed on a side of a follower magnet opposite of a drive magnet such that the magnet balancing component exerts a force on the follower magnet in the opposite direction, thereby neutralizing some of the attractive normal force between the follower magnet and the drive magnet. This relieves some of the strain on the structural assembly of the follower magnet, increasing performance and durability of the device.

Figure 1:
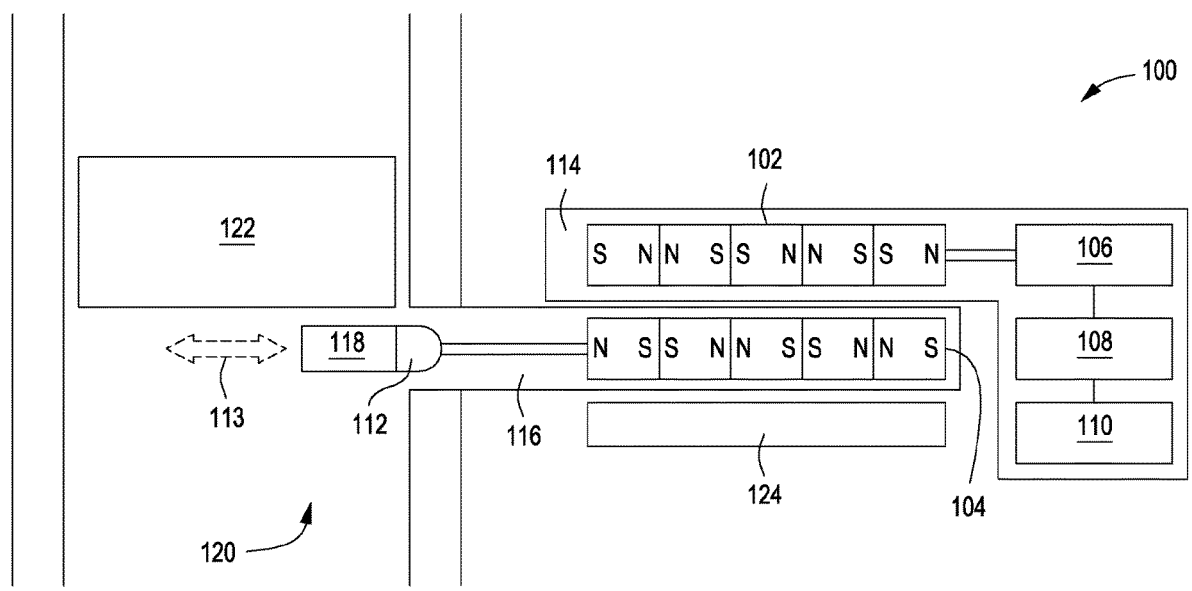
FIG. 1 is a schematic diagram of a linear magnetic coupling system with magnetic force balancing, in accordance with one or more embodiments.

Referring to the figures, FIG. 1 is a schematic diagram of a linear magnetic coupling system 100 with magnetic force balancing, in accordance with one or more embodiments. The system 100 includes one or more drive magnets 102 and one or more follower magnets 104. The drive magnet 102 and the follower magnet 104 are magnetically coupled such that movement of one can induce corresponding movement in the other. The drive magnet 102 is also coupled to an actuator 106 that is coupled to electronics 108 and a power supply 110.

The actuator 106 may be any type of actuator, such as, but not limited to, an electromechanical actuator, a hydraulic actuator, a pneumatic actuator, or any combination thereof. The power supply 110 may be any suitable power supply such as a battery and may be a local or a remote power supply. The electronics 108 control the actuator 106, which moves the drive magnet 102. In the illustrated embodiment, the drive magnet 102 moves linearly and thus induces corresponding linear movement in the follower magnet 104.

The follower magnet 104 is coupled to an actuable element 112, in which movement of the follower magnet 104 moves the actuable element 112 to perform a function. For example, the actuable element 112 may be a valve, and movement of the follower magnet can open or close the valve. The actuable element 112 can be any type of device designed to be controllably moved or actuated, including but not limited to an arm, a plug, a valve, or even another actuator. Thus, the actuator 106 controls the actuable element 112 via the drive and follower magnets 102, 104 without being physically coupled to the actuable element 112. In one or more embodiments, the drive magnet 102 and the follower magnet 104 may include a plurality of permanent magnets arranged to form a Halbach array, in which the magnetic field on one side of the magnet array is augment while the magnetic field on the other sides of the magnet array are decreased.

The north-south orientations of the drive magnet 102 and the follower magnet 104, as depicted in FIG. 1, are exemplary orientations. Alternatively, the drive magnet 102 and the follower magnet 104 can be positioned with other north-south orientations, not shown. The drive magnet 102 and the follower magnet 104 may have the same or different amount of individual magnets that may be the same or different in size. In one or more examples, each of the drive magnet 102 and the follower magnet 104 can independently include 2, 3, 4, or 5 individual magnets to 6, 8, 10, 12, 15, or more individual magnets. For example, as depicted in FIG. 1, each of the drive magnet 102 and the follower magnet 104 includes five individual magnets.

In one or more embodiments, the drive magnet 102 and the follower magnet 104 are physically isolated from each other. For example, the drive magnet 102 may be located in a drive chamber 114 and the follower magnet 104 is located outside of the drive chamber 114, such as in a follower chamber 116. In some applications, the follower chamber 116 may be exposed to an impure fluid such as production fluid that may contain various contaminants that may cause erosion or other wear on mechanical or electrical equipment. By isolating the drive magnet 102 from the follower magnet 104, the drive magnet can be physically isolated from the impure fluid, thereby increasing the life of the drive magnet 102, the actuator 108 and any other equipment physically coupled thereto. Due to magnetic coupling between the drive magnet 102 and the follower magnet 104, the actuable element 112 can still be controlled by the actuator 106 despite a physical barrier located between the drive magnet 102 and the follower magnet 104.

The exemplary system 100, depicted in FIG. 1, includes a retractable gate 118 as the actuable device 112, in which the retractable gate 118 can be extended or otherwise moved into a tubing 120 to form an obstruction within the tubing 120 to stop the passage of a downhole tool 122. For example, the actuable device 112 and the retractable gate 118 can be laterally extended, depicted by arrow 113, into and out of the tubing 120. The retractable gate 118 can be retracted and extended by controlling the actuator 106 and/or drive magnet 102. The tubing 120 may also be filled with production fluid or drilling fluid and the isolation of the drive and follower chambers 114, 116 effective to keep the actuator 106 and the drive magnet 102 isolated from the fluid.

As the drive magnet 102 and the follower magnet 104 are magnetically coupled, the magnets 102, 104 experience a magnetic coupling force towards each other. This attractive force increases the load on the actuator 106 because both the drive and follower magnets 102, 104 experience friction and other contact forces against each other or their respective chambers 114, 116. To mitigate this issue, the system 100 further includes one or more magnetic balancing components 124. The magnetic balancing component 124 is located to a side of the follower magnet 104 opposite the drive magnet 102, as depicted in FIG. 1. Thus, the magnetic balancing component 124 can be positioned at an angle of 0° or within a range from about −75° to about 75°, about −60° to about 60°, about −45° to about 45°, about −30° to about 30°, about −15° to about 15°, or about −5° to about 5°, relative to a line or a plane extending through the drive magnet 102 and the follower magnet 104. In other embodiments, the magnetic balancing component 124 can also be located to a side of or proximate to the drive magnet 102 in order to reduce the friction on the drive magnet 102 (not shown). The magnetic balancing component 124 may include a ferromagnetic material that exerts a pulling force on the follower magnet 104 in the opposite direction as does the drive magnet 102. Thus, the total normal force exerted onto the follower magnet 104 is reduced if not substantially neutralized. As such, the stress on the structural assembly of the follower magnet 104 is reduced as well and the load needed by the actuator 106 is reduced.

The magnetic balancing component 124 may take on a variety of shapes, sizes, and materials, with the appropriate shape, size, and material chosen to effectively neutralize the normal force exerted on the follower magnet 104 by the drive magnet 102. The magnetic balancing component 124 may be located within a chamber physically isolated from the follower magnet 104 or within the same chamber as the follower magnet 104 or in fluid communication with the follower magnet 104. There may or may not be a physical barrier between the follower magnet 104 and the magnetic balancing component 124. In one or more embodiments, the magnetic balancing component 124 may be placed external to a magnetic coupler device to force balance the device. Similarly, the magnetic balancing component 124 can be used to retro fit an existing magnetic coupling device into a magnetic coupling system with magnetic force balancing.

Figure 2:
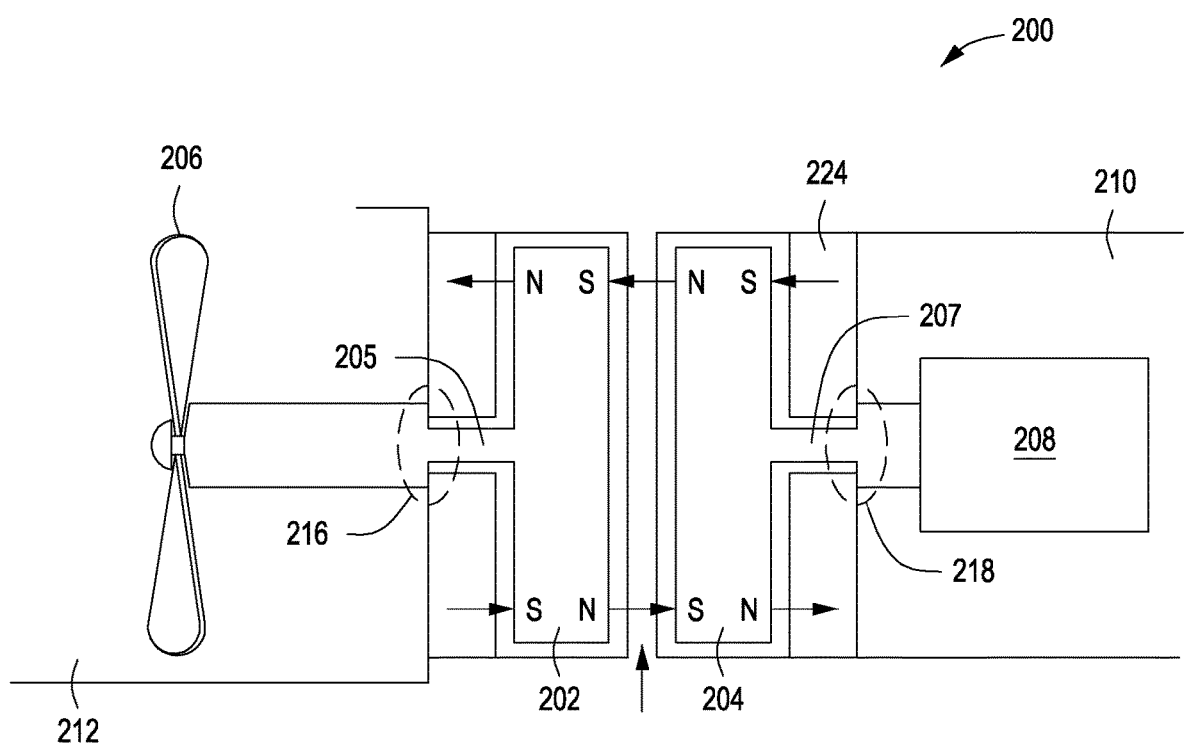
FIG. 2.

FIG. 2 is a schematic diagram of a rotational magnetic coupling system 200 with magnetic force balancing, in accordance with one or more embodiments. The system 200 includes one or more drive magnets 202 and one or more follower magnets 204. The drive magnet 202 and the follower magnet 204 are magnetically coupled such that movement of one can induce corresponding movement in the other. In this embodiment, the drive magnet 202 is coupled to and driven by a turbine 206. When the turbine 206 rotates, such as when acted on by fluid flow, the drive magnet 202 is rotated. Rotation of the drive magnet 202 causes the follower magnet 204 to rotate correspondingly. The follower magnet 204 is coupled to a generator 208, and rotation of the follower magnet 204 causes the generator 208 to produce power. For example, the drive magnet 202 can be coupled to the turbine 206 by a shaft 205 and the follower magnet 204 can be coupled to the generator 208 by a shaft 207. One or more sets of thrust bearings 216, 218 can be adjacent or otherwise located around each of the shafts 205, 207 and used to support large loads without a magnetic balance.

The drive magnet 202 and the follower magnet 204 may also be physically isolated from each other. For example, the drive magnet 202 may be located in a fluid path 212 and exposed to the fluid flow that turns the turbine 206. The follower magnet 204 and generator 208 may be contained within a follower chamber 210 physically isolated from the fluid flow by a barrier located between the drive magnet 202 and the follower magnet 204. The follower chamber 210 may include or be filled with clean fluid and/or air and subsequently sealed. However, due to magnetic coupling between the drive magnet 202 and the follower magnet 204, the rotation of the turbine 206 is able to actuate the generator 208 via rotation of the drive and follower magnets 202, 204.

To mitigate the normal force exerted on the follower magnet 204 by the drive magnet 202, the system 200 further includes a magnetic balancing component 224 located to a side of the follower magnet 204 opposite the drive magnet 202, as illustrated in FIG. 2. Thus, the magnetic balancing component 224 can be positioned at an angle of 0° or within a range from about −75° to about 75°, about −60° to about 60°, about −45° to about 45°, about −30° to about 30°, about −15° to about 15°, or about −5° to about 5°, relative to a line or a plane extending through the drive magnet 202 and the follower magnet 204. In other embodiments, the magnetic balancing component 224 can also be located to a side of or proximate to the drive magnet 202 in order to reduce the friction on the drive magnet 202 (not shown). The magnetic balancing component 224 may include a ferromagnetic material that exerts an attractive force on the follower magnet 204 in the opposite direction as does the drive magnet 202. Thus, the total normal force exerted onto the follower magnet 204 is reduced if not substantially neutralized.

The magnetic balancing component 224 may take on a variety of shapes, sizes, and materials with the appropriate shape, size, and material chosen to effectively neutralize the normal force exerted on the follower magnet 204 by the drive magnet 202. The magnetic balancing component 224 may also be located within a chamber physically isolated from the follower magnet 204 or within the same chamber as the follower magnet 204. There may or may not be a physically barrier between the follower magnet 204 and the magnetic balancing component 224.

Figure 3:
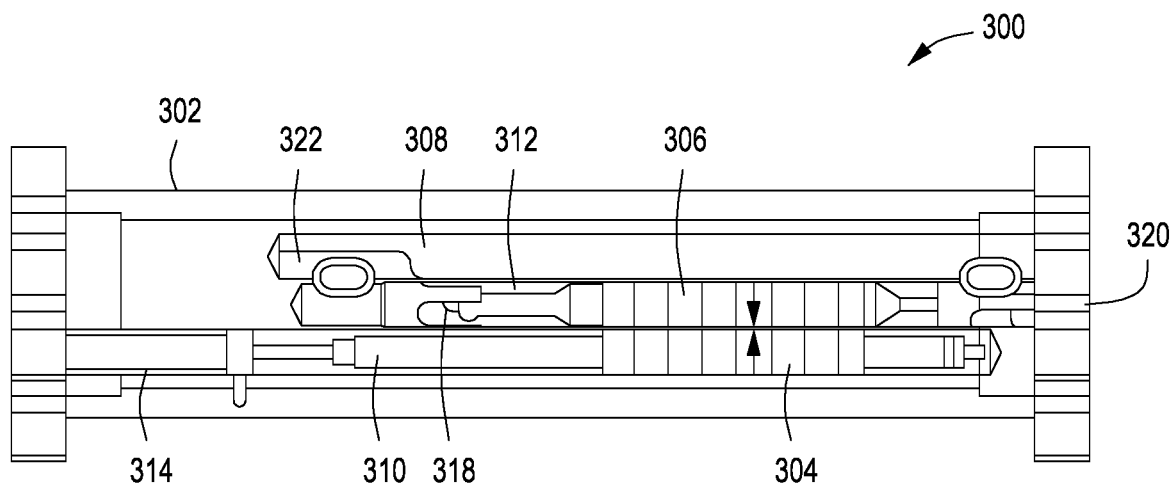
FIG. 3 is an internal view of an example flow control device with force balanced magnetic coupler, in accordance with one or more embodiments.

FIG. 3 is an internal view of an example flow control device 300 with force balanced magnetic coupler, in accordance with one or more embodiments. The device 300 includes a housing 302, one or more drive magnets 304, one or more follower magnets 306, and one or more magnetic balancing components 308. The drive magnet 304 is located within a drive chamber 310 of the housing 302 and the follower magnet 306 is located within a follower chamber 312 of the housing 302, physically isolated from the drive chamber 310. The drive magnet 304 is coupled to an actuator 314 and movable along an actuation axis 316 within the drive chamber 310. The actuator 314 may be controlled by a controller (not shown).

The housing contains one or more materials that allow the magnetic field to pass between two or more magnetic assemblies. For example, the housing 302 can be or include one or more non-ferromagnetic materials. The housing 302 can be or include, but is not limited to, one or more non-ferromagnetic steels (e.g., austenitic stainless steel or austenitic nickel-chromium alloy, such as an INCONEL® alloy), titanium or one or more alloys thereof, aluminum or one or more alloys thereof, one or more polymeric materials (e.g., plastics, resins, synthetic or natural rubbers), one or more ceramic materials, composites thereof, or any combination thereof.

In one or more embodiments, the drive magnet 304 is controlled to move between linear positions on the actuation axis 316. The drive magnet 304 is magnetically coupled to the follower magnet 306 so that movement of the drive magnet 304 moves the follower magnet 306 linearly as well. The north-south orientations of the drive magnet 304 and the follower magnet 306, can be positioned in any orientation configured in a Halbach array. In one or more examples, each of the drive magnet 304 and the follower magnet 306 can independently include 2, 3, 4, or 5 individual magnets to 6, 7, 8, 10, 12, 15, or more individual magnets. For example, as depicted in FIG. 3, the drive magnet 304 includes eight individual, permanent magnets and the follower magnet 306 includes nine individual, permanent magnets.

The follower magnet 306 is coupled to a valve 318 located in the follower chamber 312 and moves between an open position in which the valve 318 is open and a closed position in which the valve 318 is closed. When the valve is open, fluid can flow into an inlet 320 of the device 300 into the follower chamber 312 and out through the valve 318. When the valve 318 is closed, such a flow path is closed. Thus, the flow control device 300 is operable to permit flow therethrough while isolating the drive magnet 304, actuator 314, and other associated parts from the fluid.

As shown, the magnetic balancing component 308 is located within the housing 302. In certain such embodiments, the magnetic balancing component 308 may be located within a balance chamber 322 formed within the housing 302, isolating the magnetic balancing component 308 from the follower chamber 312 which may be subject to fluid flow. In certain other embodiments, the balance chamber 322 may be in fluid communication with the follower chamber 312 and/or may be coupled to an inlet and provide a fluid flow path. The magnetic balancing component 308 may also be located within the follower chamber 312. The magnetic balancing component 308 is located on a side of the follower magnet 306 opposite the drive magnet 304 such as to exert a normal force on the follower magnet 306 in the opposite direction as exerted on the follower magnet 306 by the drive magnet 304. Thus, the net normal force on the follower magnet 306 is reduced or substantially neutralized, while the coupling force between the drive magnet 304 and the follower magnet 306 is typically not reduced due to the magnetic balancing component 308. Thus, the magnetic balancing component 308 can be positioned at an angle of 0° or within a range from about −75° to about 75°, about −60° to about 60°, about −45° to about 45°, about −30° to about 30°, about −15° to about 15°, or about −5° to about 5°, relative to a line or a plane extending through the drive magnet 304 and the follower magnet 306.

Figure 4:
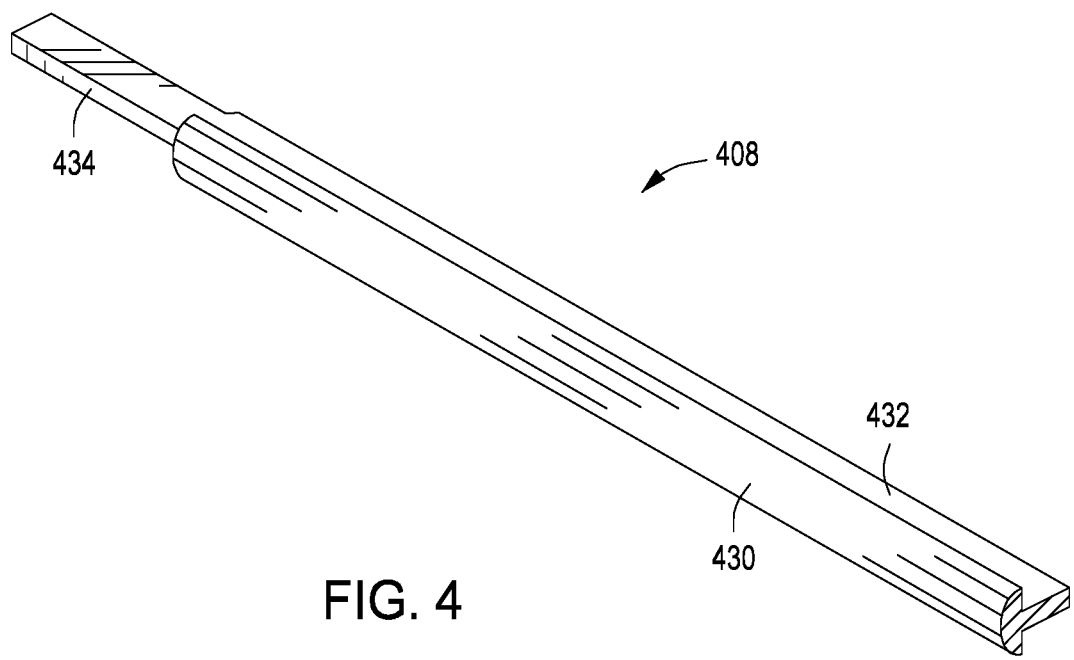
FIG. 4 is a perspective view of an example magnetic balancing component, such as the magnetic balancing component of FIG. 3, in accordance with one or more embodiments.

FIG. 4 is a perspective view of an exemplary magnetic balancing component 408 usable in any of the above embodiments. The magnetic balancing component 408 can have a variety of shapes and sizes and include one or more materials. The magnetic balancing component 408 may be designed to have a sufficient mass and length, and be placed in close enough proximity of a follower magnet (e.g., the follower magnet 306 depicted in FIG. 3) to exert an attractive force on the follower magnet comparable to the normal coupling force exerted on the follower magnet by the drive magnet. The shape may be a round or square rod, a tube, or a specially designed shape. The magnetic balancing component 408 includes a side 430 coupled to a positioning feature 432. The side 430 contains sufficient ferromagnetic material to generate balancing magnetic force. The positioning feature 432 pushes or directs the side 430 into position and leaves enough space in the balance chamber to facilitate fluid flow therethrough.

Any of the magnets described and discussed herein, including, but not limited to, the drive magnets 102, 202, 304 and the follower magnets 104, 204, 306, can be or include one or more rare earth materials and/or one or more ferromagnetic materials. Exemplary rare earth materials or magnets can be or include, but are not limited to, one or more lanthanide series elements (e.g., lanthanum, cerium, praseodymium, neodymium, promethium, samarium, europium, gadolinium, terbium, dysprosium, holmium, erbium, thulium, ytterbium, and lutetium), scandium, yttrium, alloys thereof, or any combination thereof. Exemplary ferromagnetic materials or magnets can be or include, but are not limited to, one or more iron, nickel, chromium, manganese, alloys thereof, or any mixture. In one or more examples, any of the magnets, including, but not limited to, the drive magnets 102, 202, 304 and the follower magnets 104, 204, 306, can be or include, but are not limited to samarium cobalt magnets, neodymium magnets, ferrite magnets, or an alnico magnet (e.g., iron, aluminum, nickel, cobalt, and optionally copper and/or titanium).

The magnetic balancing component 124, 224, 308, 408 can include or be made from, but is not limited to, one or more ferromagnetic materials, such as steel, ferritic stainless steel (e.g., annealed 416 stainless steel (ES-MA-19-27)), iron, nickel, chromium, manganese, alloys thereof, or any mixture thereof. In one embodiment, the magnetic balancing component 124, 224, 308, 408 is a nickel alloy containing about 77 wt % of nickel, about 16 wt % of iron, about 5 wt % of copper, and about 2 wt % of molybdenum. In another embodiment, the magnetic balancing component 124, 224, 308, 408 is a ferrite material containing iron oxide.

In addition to the embodiments described above, embodiments of the present disclosure further relate to one or more of the following paragraphs:

1. A magnetic coupling system, comprising: a drive magnet; a follower magnet magnetically coupled to the drive magnet, wherein movement of the drive magnet induces corresponding movement of the follower magnet; and a magnetic balancing component located to a side of the follower magnet, wherein the magnetic balancing component and the drive magnet exert attractive magnetic forces on the follower magnet in opposite directions.

2. A magnetic coupling system, comprising: a drive magnet; a follower magnet magnetically coupled to the drive magnet, wherein movement of the drive magnet induces corresponding movement of the follower magnet; and a magnetic balancing component located to a side of the follower magnet opposite the drive magnet, wherein the magnetic balancing component and the driver magnet exert attractive magnetic forces on the following magnet in opposite directions.

3. A magnetically coupled actuation system, comprising: a drive actuator; a drive magnet coupled to and movable by the actuator; a follower magnet isolated from and magnetically coupled to the drive magnet, wherein movement of the drive magnet induces corresponding movement of the follower magnet; a follower device coupled to and driven by movement of the follower magnet; and a magnetic balancing component located to a side of the follower magnet opposite the drive magnet, wherein the magnetic balancing component and the drive magnet exert attractive magnetic forces on the follower magnet in opposite directions.

4. A method of balancing a magnetic coupler, comprising: locating a magnetic balancing component to a side of a follower magnet opposite a drive magnet, wherein the follower magnet is magnetically coupled to the drive magnet; and exerting an attractive magnetic force onto the follower magnet in a direction opposite another attractive magnetic force exerted onto the follower magnet by the drive magnet.

5. The method of paragraph 4, further comprising moving the drive magnet and inducing movement in the follower magnet via movement of the drive magnet.

6. The method of paragraph 5, further comprising actuating a valve via movement of the follower magnet.

7. The method of paragraph 4, wherein the follower magnet is physically isolated from the drive magnet.

8. The system or the method according to any one of paragraphs 1-7, wherein the magnetic balancing component is located to the side of the follower magnet opposite the drive magnet.

9. The system or the method according to any one of paragraphs 1-8, wherein the magnetic balancing component is located to the side of the drive magnet.

10. The system or the method according to any one of paragraphs 1-9, further comprising a housing comprising a drive chamber in which the drive magnet is located, a follower chamber isolated from the drive chamber and in which the follower magnet is located, and a balancing chamber in which the magnetic balancing component is located.

11. The system or the method according to any one of paragraphs 1-10, wherein the drive magnet is coupled to and movable via an actuator.

12. The system or the method of paragraph 11, wherein the actuator comprises at least one of an electrical system, a mechanical system, a hydraulic system, a pneumatic system, or any combination thereof.

13. The system or the method according to any one of paragraphs 1-12, wherein the follower magnet is coupled to an actuable element movable by movement of the follower magnet.

14. The system or the method of paragraph 13, wherein the actuable element is a valve.

15. The system or the method according to any one of paragraphs 1-14, wherein the follower device is connected to and moveable to open and close a valve.

16. The system or the method according to any one of paragraphs 1-15, wherein the linear movement of the drive magnet induces linear movement of the follower magnet.

17. The system or the method according to any one of paragraphs 1-16, wherein rotational movement of the drive magnet induces rotational movement of the follower magnet.

18. The system or the method of paragraph 17, wherein the drive magnet is coupled to and driven by a turbine and the follower magnet is coupled to and actuates a generator 19. The system or the method of paragraph 18, wherein a physical barrier is located between the drive magnet and the follower magnet.

20. The system or the method according to any one of paragraphs 1-19, wherein each of the drive magnet and the follower magnet comprises a Halbach array.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A magnetic coupling system, comprising:
   a drive magnet;
   a follower magnet eccentrically located relative and magnetically coupled to the drive magnet, wherein linear movement of the drive magnet induces a corresponding similar linear movement of the follower magnet; and
   a magnetic balancing component eccentrically located relative to the follower magnet, wherein the magnetic balancing component and the drive magnet exert attractive magnetic forces on the follower magnet in opposite directions.

2. The system of claim 1, wherein the magnetic balancing component is eccentrically located to the side of the follower magnet opposite the drive magnet.

3. The system of claim 1, wherein the magnetic balancing component is eccentrically located to the side of the drive magnet.

4. The system of claim 1, further comprising a housing comprising a drive chamber in which the drive magnet is located, a follower chamber isolated from the drive chamber and in which the follower magnet is located, and a balancing chamber in which the magnetic balancing component is located, wherein the drive magnet and the follower magnet experience friction and other contact forces against the respective drive and follower chambers when moved and wherein the magnetic balancing component and the drive magnet attractive magnetic forces on the follower magnet in opposite directions reduces the friction on the follower magnet.

5. The system of claim 1, wherein the drive magnet is coupled to and movable via an actuator.

6. The system of claim 5, wherein the actuator comprises at least one of an electrical system, a mechanical system, a hydraulic system, a pneumatic system, or any combination thereof.

7. The system of claim 1, wherein the follower magnet is coupled to an actuable element movable by movement of the follower magnet.

8. The system of claim 7, wherein the actuable element is a valve.

9. The system of claim 1, wherein linear movement of the drive magnet induces linear movement of the follower magnet.

10. The system of claim 1, wherein a physical barrier is located between the drive magnet and the follower magnet.

11. The system of claim 1, wherein each of the drive magnet and the follower magnet comprises a Halbach array.

12. A magnetically coupled actuation system, comprising:
    a drive actuator;
    a drive magnet coupled to and movable by the actuator;
    a follower magnet eccentrically located relative to, isolated from, and magnetically coupled to the drive magnet, wherein linear movement of the drive magnet induces a corresponding similar linear movement of the follower magnet;
    a follower device coupled to and driven by movement of the follower magnet; and
    a magnetic balancing component eccentrically located to the side of the follower magnet opposite the drive magnet, wherein the magnetic balancing component and the drive magnet exert attractive magnetic forces on the follower magnet in opposite directions.

13. The system of claim 12, wherein the follower device is connected to and moveable to open and close a valve.

14. The system of claim 12, wherein the linear movement of the drive magnet induces linear movement of the follower magnet.

15. The system of claim 12, wherein each of the drive magnet and the follower magnet comprises a Halbach array.

16. A method of balancing a magnetic coupler, comprising:
    eccentrically locating a magnetic balancing component to the side of a follower magnet opposite a drive magnet, wherein the follower magnet is eccentrically located relative and magnetically coupled to the drive magnet so as to create an attractive magnetic normal force exerted onto the follower magnet by the drive magnet; and
    exerting an attractive magnetic force onto the follower magnet by the magnetic balancing component in a direction opposite the normal force from the drive magnet to balance the total normal force exerted onto the follower magnet.

17. The method of claim 16, further comprising moving the drive magnet linearly and inducing a corresponding similar linear movement in the follower magnet via movement of the drive magnet.

18. The method of claim 17, further comprising actuating a valve via movement of the follower magnet.

19. The method of claim 16, wherein the follower magnet is physically isolated from the drive magnet.

* * * * *